United States Patent [19]

Hatting et al.

[11] Patent Number: 4,854,823
[45] Date of Patent: Aug. 8, 1989

[54] LEAK INDICATING DEVICE FOR CENTRIFUGAL PUMP

[76] Inventors: Paul Hatting, Tumpweg 15, D-4152 Kempen; Kurt Wienen, Schillerstr. 15, D-4172 Straelen 1, both of Fed. Rep. of Germany

[21] Appl. No.: 154,940

[22] Filed: Feb. 11, 1988

[30] Foreign Application Priority Data

Feb. 14, 1987 [DE] Fed. Rep. of Germany ..... 37046713

[51] Int. Cl.$^4$ ............................................. F04B 49/10
[52] U.S. Cl. ...................................... 417/63; 417/420; 417/423.11; 417/423.14; 464/29
[58] Field of Search ................. 417/63, 372, 373, 420, 417/423 R, 423 M, 423 P, 423 T; 464/17, 29; 310/87, 57, 52, 54, 55, 64; 73/46; 340/682; 92/5 R; 165/47, 70, 11.1

[56] References Cited

U.S. PATENT DOCUMENTS

| | | | |
|---|---|---|---|
| 2,662,478 | 12/1953 | Surre | 417/63 |
| 3,131,638 | 5/1964 | Wilson et al. | 92/5 R |
| 3,163,790 | 12/1964 | White | 310/54 |
| 3,605,566 | 9/1971 | Vetter | 417/63 |
| 3,661,060 | 5/1972 | Bowen | 417/63 X |
| 4,013,384 | 3/1977 | Oikawa | 417/420 X |
| 4,120,618 | 10/1978 | Klaus | 417/420 |
| 4,226,574 | 10/1980 | Villette | 417/420 |
| 4,569,634 | 2/1986 | Mantell | 417/63 |

FOREIGN PATENT DOCUMENTS 1800018 11/1975 Fed. Rep. of Germany .
3334638 3/1984 Fed. Rep. of Germany ........ 417/63

Primary Examiner—Carlton R. Croyle
Assistant Examiner—Eugene L. Szczecina, Jr.
Attorney, Agent, or Firm—Willian Brinks Olds Hofer Gilson & Lione

[57] ABSTRACT

A leak indicating device for a magnetic centrifugal pump having a separating pot which seals against the pumped medium and which comprises two separating pots with collars inserted one within another. The device contains a ring which is clamped between the collars of the two separating pots. The ring has a radial bore which connects the space between the separating pots to an indicator.

11 Claims, 2 Drawing Sheets

LEAK INDICATING DEVICE FOR CENTRIFUGAL PUMP

BACKGROUND OF THE INVENTION

The present invention relates to a leak indicating device for a magnetic centrifugal pump, and more particularly to such a pump having two separating pots with collars inserted one within another which seal against the pumped medium.

DE-B 18 00 018 discloses a hydraulic membrane pump which has three abutting individual membranes separating the delivery space and the hydraulic space. The central membrane has slots which are filled with hydraulic liquid. If a membrane is damaged, delivery medium or hydraulic medium reaches these slots and forces the liquid situated therein into a container disposed outside the pump where it triggers a signal device.

This leak indicating device was developed and is suitable primarily for membrane pumps. Its principal disadvantage is that the space between the outer two membranes must always be filled with liquid under pressure so as to hydraulically couple the membranes. This, unfortunately, requires considerable technical expense.

Some magnetic centrifugal pumps, on the other hand, have two separating pots inserted within one another. The inner separating pot comprises a chemically resistant plastic material and the outer separating pot comprises a fiber composite material.

When the inner pot is damaged by erosion or solids in the medium being pumped, the damage becomes apparent only when the outer pot and the metal shell are destroyed by the highly-aggressive, toxic or corrosive media and the medium is conveyed into the environment under the pressure of the operating pump.

SUMMARY OF THE INVENTION

The present invention is a device which recognizes and registers leakage caused by damage to the inner separating pot of a magnetic centrifugal pump.

This leak indicating device has a ring which is positioned between the collars of the two separating pots. The ring has a radial bore which connects the space between the separating pots to an indicator, such as a pressure or vacuum monitoring device or an electronic moisture or resistance monitoring device. The radial bore is preferably connected to the space between the separating pots by means of an annular groove extending around the inner surface of the ring.

Because leakage can occur at any point in the separating pot, the intermediate space in one preferred embodiment is advantageously defined by a groove formed in the outer surface of the inner separating pot. This groove extends spirally over the outer surface of the separating pot and is connected to the annular groove and radial bore.

In another embodiment, the intermediate space is filled with a reticular fabric or plastic mat which facilitates transport of the medium by means of pump pressure from the damaged portion of the inner pot to the peripheral annular groove in the ring.

BRIEF DESCRIPTION OF THE DRAWINGS

Exemplary embodiments will be described below in more detail with reference to the drawings, in which.

DESCRIPTION OF THE PREFERRED EMBODIMENTS

Figure 1:
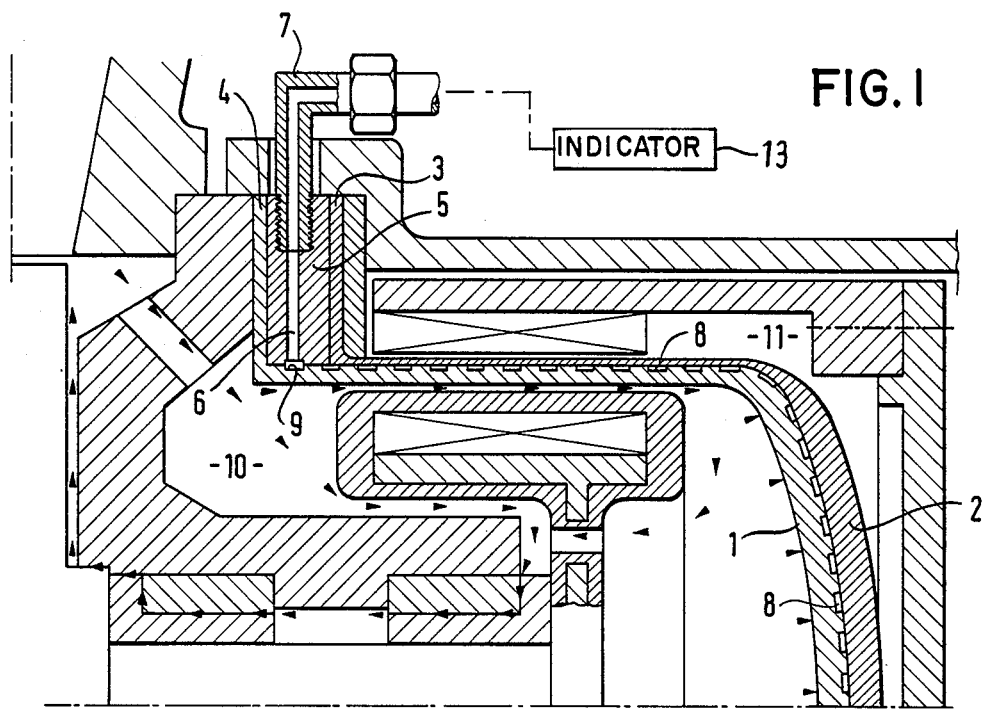
FIG. 1 is a partial longitudinal cross section of a first embodiment of a magnetic pump with a leak indicating device.

With reference to FIG. 1, which shows a longitudinal cross section of the pump, separating pots 1 and 2 divide the pump into the product space 10 and the drive space 11.

A ring 5 is clamped between the collar 3 of the outer separating pot 2 and the collar 4 of the inner separating pot 1. Ring 5 has a radial bore 6 which is connected to an indicator 13 outside the pump by means of a tube 7. Indicator 13 is represented generically in FIG. 1.

Figure 2:
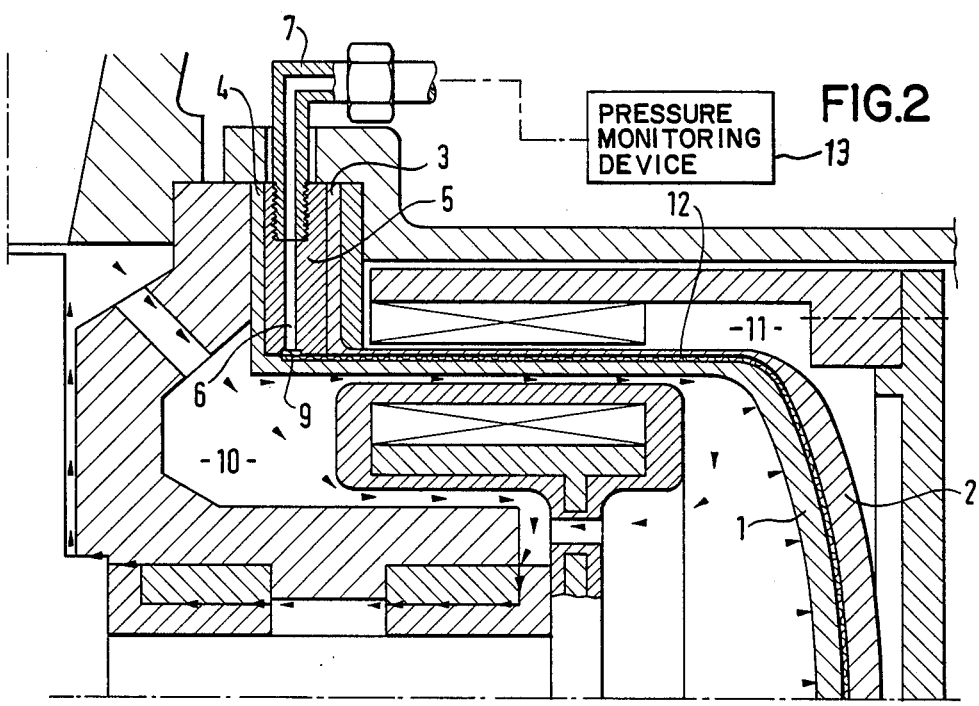
FIG. 2 is a partial longitudinal cross section of a second embodiment of a magnetic pump with a leak indicating device, also illustrating a first species of indicator.
Figure 3:
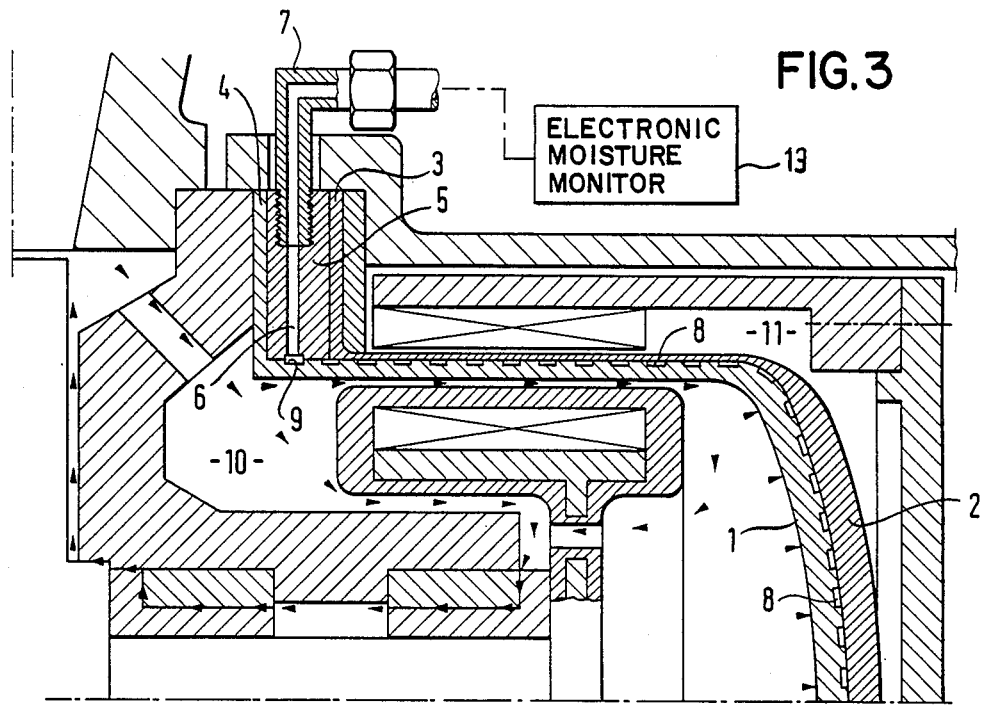
FIGS. 3 and 4 are views like that of FIG. 1, illustrating second and third species of indicators, respectively.
Figure 4:
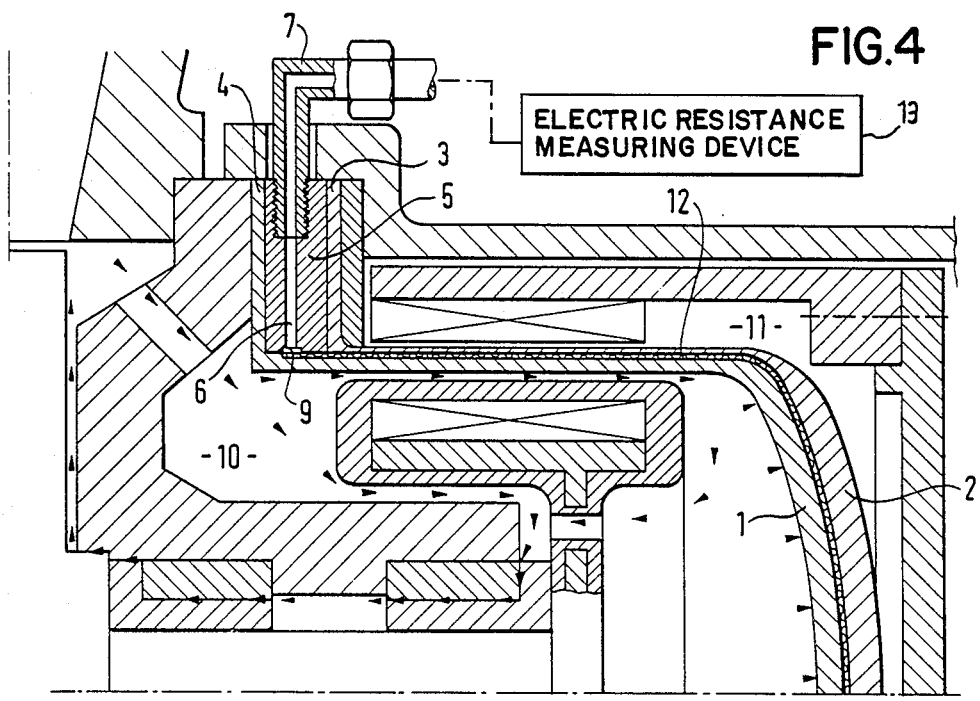

The indicator 13 can be a pressure or vacuum monitoring device (FIG. 2), such as a manometer, or an electronic moisture or resistance monitoring device (FIGS. 3 and 4). The indicator 13 can in turn be connected to an acoustic device, such as a horn, or an optical signal device, such as an illuminating lamp. In the case of a pressure monitoring device, for example, a sudden change in pressure in the space between the separating pots is immediately recognized and registered.

The other end of the radial bore 6 communicates with the annular groove 9 which, in the illustrated embodiment, is opposed to a corresponding groove in the separating pot 1.

In one particular embodiment, the intermediate space between separating pots 1 and 2 is a thread-like second groove 8 machined into the exterior of the inner pot 1. This second groove 8 terminates in the peripheral annular groove 9. Additional longitudinal grooves (not illustrated) can also be provided which intersect the thread-like second groove at approximately 90 degree angles and enable a more rapid transport towards the groove 9.

The arrows shown in FIGS. 1 and 2 indicate the flow direction of the medium to be pumped.

With reference to FIG. 2, an intermediate space is shown between the pots which is filled with a pressure-resistant reticular fabric or plastic mat 12 which facilitates transport of the medium by means of pump pressure from the damaged portion of the inner pot to the peripheral annular groove 9 in the ring 5.

Although the present invention has been described in connection with presently preferred embodiments, those skilled in the art will recognize many modifications to sequence, arrangement, portions, elements, and materials which can be used in the practice of the invention without departing from its scope. It is intended that such changes and modifications be covered by the following claims.

We claim:

1. In a magnetic centrifugal pump having a separating pot which seals against a pumped medium, said separating pot including inner and outer separating pots each having a collar, said inner separating pot being disposed within said outer separating pot and being separated therefrom by a space, a leak indicating device comprising: a ring positioned between the collars of said separating pots, said ring having a radial bore formed therein and connecting the space between said separating pots to an indicator.

2. The apparatus of claim 1, wherein the radial bore is connected to the space between the separating pots by means of a groove extending around the inner surface of the ring.

3. The apparatus of claim 2, wherein the space between the separating pots is defined by a second groove formed on an outer surface of the inner separating pot, said second groove extending spirally over the outer surface of the inner separating pot and communicating with the first groove, the first groove extending around the inner surface of the ring.

4. The apparatus of claim 2, wherein the space between the separating pots is filled with a fabric up to the region of the groove, the groove extending around the inner surface of the ring.

5. The apparatus of claim 2, wherein the space between the separating pots is filled with a plastic mat up to the region of the groove, the groove extending around the inner surface of the ring.

6. The apparatus of claim 1, wherein the space between the separating pots is defined by a second groove formed on an outer surface of the inner separating pot said second groove extending spirally over the outer surface of the inner separating pot and communicating with the first groove, the first groove extending around the inner surface of the ring.

7. The apparatus of claim 1, wherein the space between the separating pots is filled with a fabric up to the region of the groove, the groove extending around the inner surface of the ring.

8. The apparatus of claim 1, wherein the space between the separating pots is filled with a plastic mat up to the region of the groove, the groove extending around the inner surface of the ring.

9. The apparatus as claimed in one of claims 1-8, wherein the indicator is a pressure monitoring device.

10. The apparatus as claimed in one of claims 1-8, wherein the indicator is an electronic moisture measuring device.

11. The apparatus as claimed in one of claims 1-8, wherein the indicator is an electronic resistance measuring device.

* * * * *